(No Model.)

J. L. CAMPBELL.
THERMOSTAT.

No. 357,463. Patented Feb. 8, 1887.

Witnesses
Wm. J. Panner
L. L. Burket

Inventor
Jas. L. Campbell,
By J. A. Lehmann,
Attorney

UNITED STATES PATENT OFFICE.

JAMES L. CAMPBELL, OF WEST ELIZABETH, PENNSYLVANIA.

THERMOSTAT.

SPECIFICATION forming part of Letters Patent No. 357,463, dated February 8, 1887.

Application filed September 30, 1886. Serial No. 214,963. (No model.)

*To all whom it may concern:*

Be it known that I, JAMES L. CAMPBELL, of West Elizabeth, in the county of Allegheny and State of Pennsylvania, have invented certain new and useful Improvements in Thermostats; and I do hereby declare the following to be a full, clear, and exact description of the invention, such as will enable others skilled in the art to which it pertains to make and use it, reference being had to the accompanying drawings, which form part of this specification.

My invention relates to an improvement in thermostats; and it consists in the combination of two tubes or rods, one of which is rigidly clamped at one end and connected at the other end to a wooden rod, which is fastened at its outer end to the lower end of the operating-lever, the other tube or rod being fastened at one end to a thumb screw or other adjusting device and at the other end to a rod which connects with the operating-lever and the spring, which keeps a constant tension upon the lever, as will be more fully described hereinafter.

The object of my invention is to provide a thermostat for buildings, churches, theaters, hot-houses, incubators, or any place of that character where a heat-regulator is needed, and in which the expansion of two tubes or rods in opposite directions cause a lever, to which they are connected, to operate a valve, damper, or other device by means of which the heat is controlled.

Figure 1:
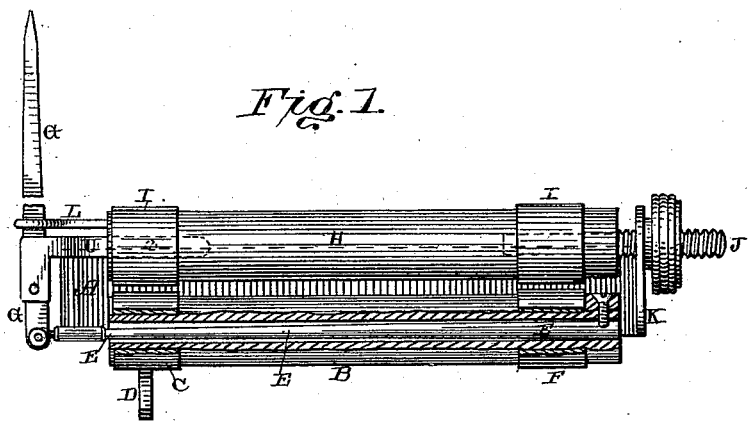
Figure 2:
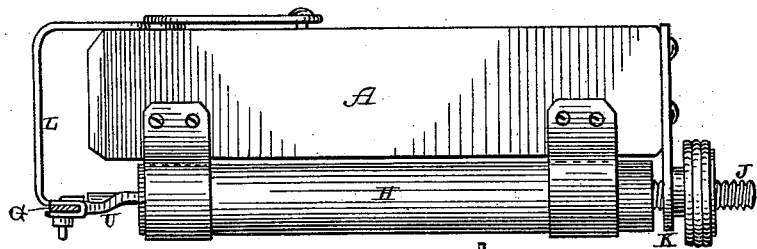
Figures 3, 4:
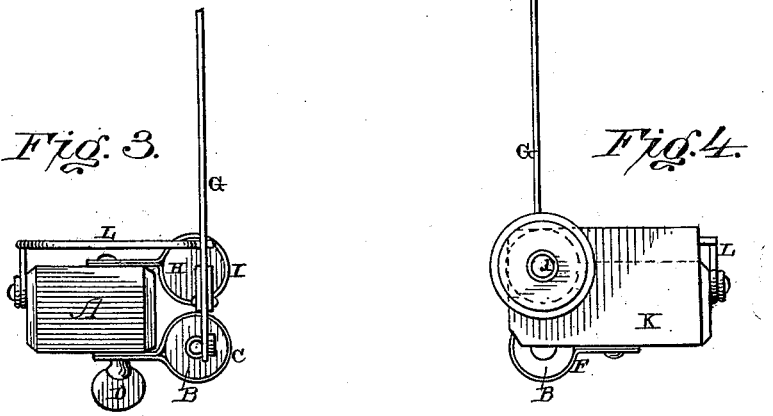

Figure 1 is a side elevation, partly in section, of a thermostat embodying my invention. Fig. 2 is a plan view of the same. Figs. 3 and 4 are end views taken from opposite ends.

A represents a suitable support of any kind, to which the other parts of the thermostat are connected. The lower tube, B, which may be made either of hard rubber or metal, or consist of a metal rod, is rigidly secured to the support A by means of a band, C, which is fastened around its end, and to the support by means of a set-screw, D. This band C serves to hold the rod or tube B rigidly at this end, so that when expansion takes place it must be toward the other end. As here constructed, a wooden rod, E, is loosely passed through the tube B, and is rigidly fastened to it at its free end, which free end is supported in position by means of a band or support, F, through which the tube or rod can freely move endwise. This wooden rod, as here shown, is passing through this tube B, but the rod may be placed outside of the tube, if so desired; but the rod must be fastened to the end of the tube, as here shown, so that the endwise expansion of the tube will exert a pull upon the rod. The outer free end of this wooden rod is pivoted to the lower end of the operating-lever G, which is connected at its upper end to a valve, damper, or heat-regulator of any kind.

The upper tube or rod, H, which may be made either of rubber or metal, or consist of a solid metal rod, is supported in a horizontal position by means of the two loops I, which are connected to the support A, and which tube or rod H has rigidly fastened to one end a screw, J, which passes through a plate, K, which is secured to one end of the support A, and which screw receives a thumb-nut upon the outer side of the plate for the purpose of regulating the distance that the expansion of the tube or rod H shall move the operating-lever. To the opposite end of the tube or rod H is fastened a connecting-rod, U, which is also pivoted to the operating-lever G, as shown, and at but a slight distance from the point at which the wooden rod is fastened to the lever. Any expansion of this tube or rod H causes the rod to move endwise through the loops I toward the lever, and this endwise movement allows the spring L to move the upper end of the lever through a portion of a circle. This spring L is fastened to the support A, and has its free end to bear against the lever, so as to force it sidewise whenever the expansion of the rod or tube H will allow it to move. This spring exerts a constant tension upon the lever, and causes the lever to move at the slightest expansion of the rod or tube H.

It will be seen that the two tubes or rods B H expand in opposite directions, and, both of them being connected to the lever, the lever is made to move back and forth at its free end by the expansion and contraction of the two rods or tubes. By means of the construction here shown there are no dead-points in the thermostat, each joint or connection is direct acting, and consequently there is no loss of power by friction. The amount of movement given to the operating-lever is regulated by the thumb-nut on the tube H.

Having thus described my invention, I claim—

1. In a thermostat, the combination of the two tubes or rods, suitable clamps for rigidly fastening their opposite ends to a suitable support, so that they will expand in opposite directions, rods connected to the tubes at one end and at their opposite ends to a pivoted lever, the pivoted operating-lever, and a spring which bears against the lever, substantially as shown.

2. In a thermostat, the combination of the rod or tube B, the wooden rod connected thereto, a clamp for holding the tube or rod at one end, and the operating-lever with an upper tube or rod, suitable supports therefor, a rod for connecting it with the operating-lever, a regulating-screw, and a spring for bearing against the operating-lever and forcing it outward, substantially as described.

In testimony whereof I affix my signature in presence of two witnesses.

JAMES L. CAMPBELL.

Witnesses:
J. M. SHOAF,
CHARLEY M. SHOAF.